US007954577B2

(12) United States Patent
Wang

(10) Patent No.: US 7,954,577 B2
(45) Date of Patent: Jun. 7, 2011

(54) ELECTRIC WHEELCHAIR

(75) Inventor: Arthur Wang, Kaohsiung County (TW)

(73) Assignee: Freerider Corp., Kaohsiung County (TW)

( * ) Notice: Subject to any disclaimer, the term of this patent is extended or adjusted under 35 U.S.C. 154(b) by 156 days.

(21) Appl. No.: 12/457,866

(22) Filed: Jun. 24, 2009

(65) Prior Publication Data

US 2010/0327557 A1 Dec. 30, 2010

(51) Int. Cl.
*B60R 21/00* (2006.01)

(52) U.S. Cl. .................... 180/65.1; 280/755; 280/304.1; 280/250.1

(58) Field of Classification Search ............... 280/304.1, 280/755, 124.128, 250.1, 310, 647, 47.16–47.18, 280/47.25; 180/65.1
See application file for complete search history.

(56) References Cited

U.S. PATENT DOCUMENTS

2007/0222199 A1 * 9/2007 Schattner ...................... 280/755

* cited by examiner

*Primary Examiner* — J. Allen Shriver, II
*Assistant Examiner* — Erez Gurari
(74) *Attorney, Agent, or Firm* — Rosenberg, Klein & Lee

(57) ABSTRACT

An electric wheelchair is disclosed. The electric wheelchair includes a main frame correspondingly pivoted with a foldable chair while the folding of the chair connects with an accessory tip wheel. Moreover, the main frame is disposed with main wheels and a front wheel set arranged on front of the main wheel correspondingly on each of two sides thereof. A footrest that is pulled out or stored in the main frame is arranged between the two front wheel sets. In use, the footrest is pulled out of the main frame and the chair is moved and unfolded. At the same time, the accessory tip wheel tilted a little angle is extended out of the main frame by a connecting member. Thereby the problem caused by movement of the center of gravity of the wheelchair while moving can be solved and the safety of users is ensured.

4 Claims, 7 Drawing Sheets

ELECTRIC WHEELCHAIR

BACKGROUND OF THE INVENTION

1. Fields of the Invention

The present invention relates to an electric wheelchair, especially to an electric wheelchair being folded into a movable luggage or extended into an assistant wheelchair allowing people to sit on by a pivoted member and a foldable member. Together with an accessory tip wheel tilted a little angle, the problem caused by caused by movement of the center of gravity of the wheelchair while moving can be solved and the safety of users is ensured.

2. Descriptions of Related Art

Some people suffering from serious diseases or accidents such as car accidents or stroke have paralysis involving the lower extremities. Some are nursing care recipients who are bed-bound and unable to move or walk. This results in muscle atrophy and weakness in their legs and they could not walk any more. Some are elders whose psychological functions are impaired and moved slowly. Once these handicapped people intend to move a long distance, they need crutches or wheelchairs. However, these mobility aid devices are operated manually. This is not only energy consuming but the moving speed is also limited. Thus the devices have caused trouble and inconvenience to users.

Thus some manufactures have invented various electric equipments such as electric scooters and electric wheelchairs. By the power from electricity, handicapped people can move more easily and conveniently. Although these devices help handicapped people a lot in their daily lives, they still have some problems in use. In fact, most of the electric wheelchairs is designed in an integrated structure and is unable to be folded for storage. When not in use, they need much storage space. This causes inconvenience to users and manufacturers, either in storage or in transmission. Some manufacturers use detachable design to reduce the storage space of electric wheelchairs. Yet it takes time to disassemble the electric wheelchairs and the operation is also trouble and inconvenient. Thus there is a space to improve the folding of the electric wheelchairs.

Besides the folding problem mentioned above, when the electric wheelchair is moving, the center of gravity of the wheelchair is moved due to the inertia once users brake the wheelchair or lean backwards. This places users in risk for harm.

Thus there is a need to invent novel electric wheelchairs that improve the above shortcomings and have higher practical value.

SUMMARY OF THE INVENTION

Therefore it is a primary object of the present invention to provide an electric wheelchair that is folded into a movable luggage or is located into an assistant wheelchair allowing people to sit on by a pivoted member and a connecting member. Thus the electric wheelchair is more convenient to use, either in storage or in transmission. Therefore, the practical value of the electric wheelchair is further enhanced.

In order to achieve above object, an electric wheelchair of the present invention consists of a main frame correspondingly pivoted with a foldable chair while the folding of the chair connects with an accessory tip wheel. Moreover, the main frame is arranged with main wheels and a front wheel set disposed on front of the main wheel correspondingly on each of two sides thereof. A footrest being pulled out or received in the main frame is arranged between the two front wheel sets. In use, the footrest is pulled out of the main frame and the chair is lifted up and unfolded. Simultaneously, the accessory tip wheel tilted a little angle is extended out of the main frame by a connecting member. Thereby the problem caused by movement of the center of gravity of the wheelchair during movement is solved and the safety of users is maintained.

After the chair being folded, the accessory tip wheel is also driven to be received, next to the main wheels. Together with a grip pulled out of the main frame, the accessory tip wheel is used as a rolling wheel for transmission of the folded electric wheelchair being dragged.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
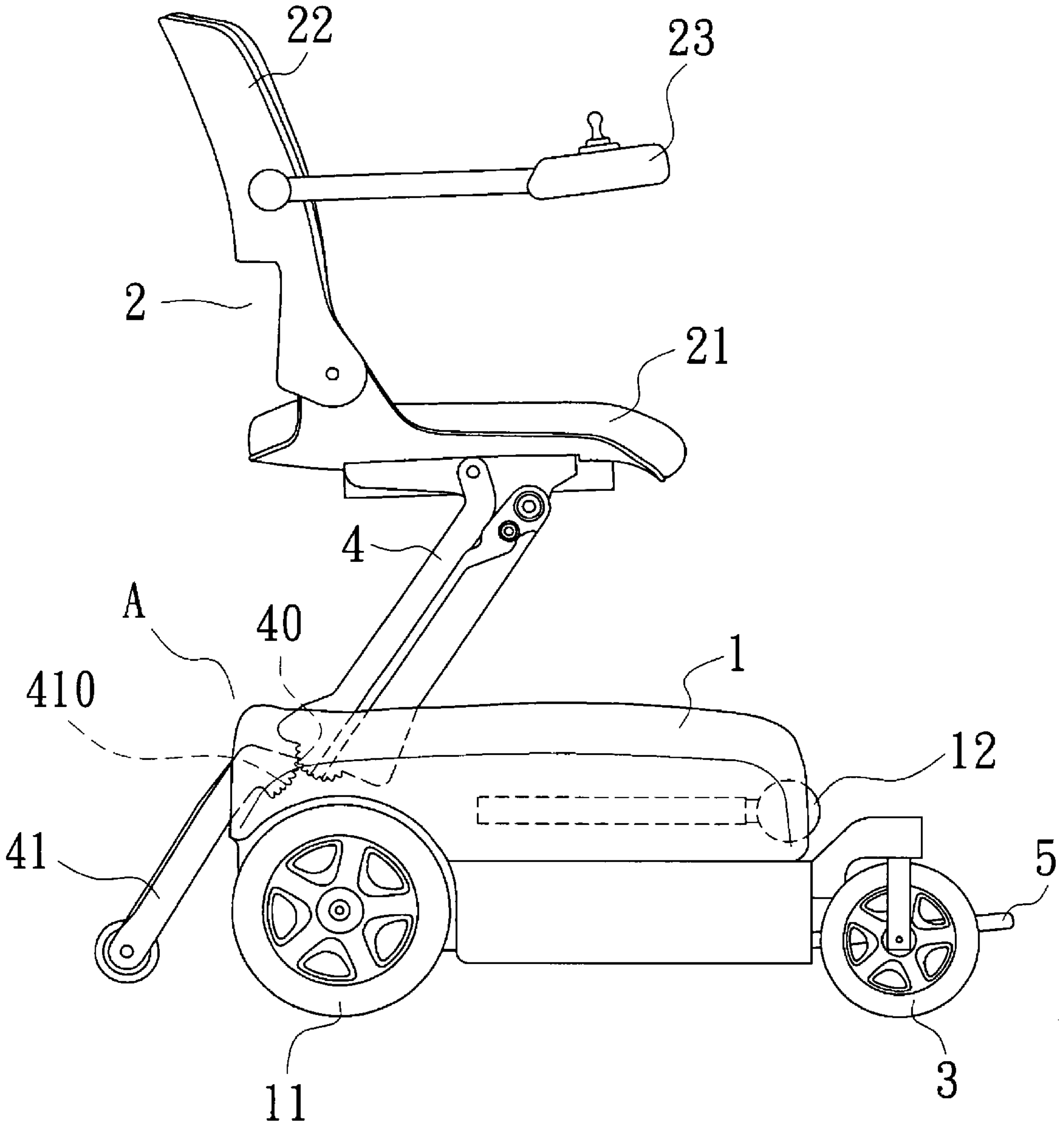
FIG. 1 is a side view of an embodiment in an extended state according to the present invention.
Figure 2:
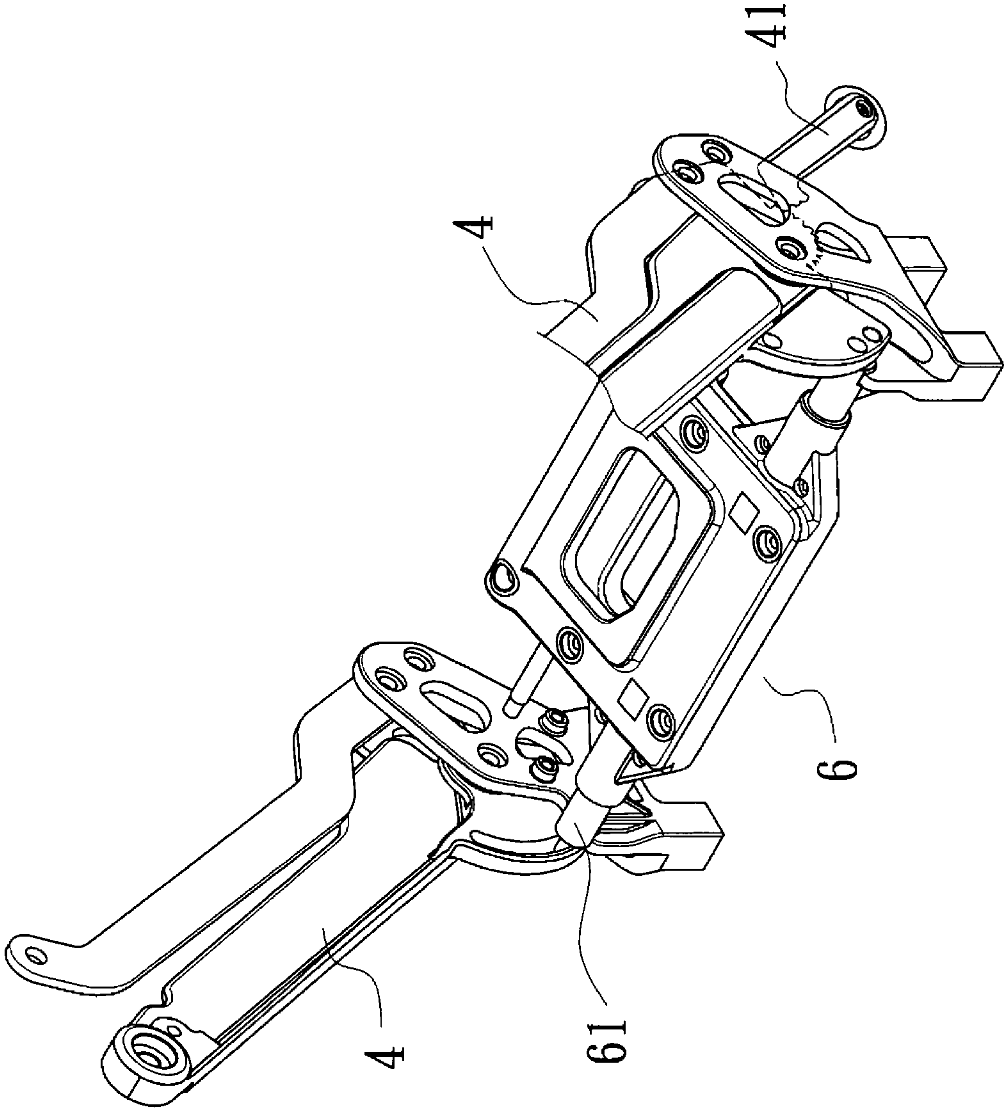
FIG. 2 is a perspective view of a connecting member according to the present invention.
Figure 3:
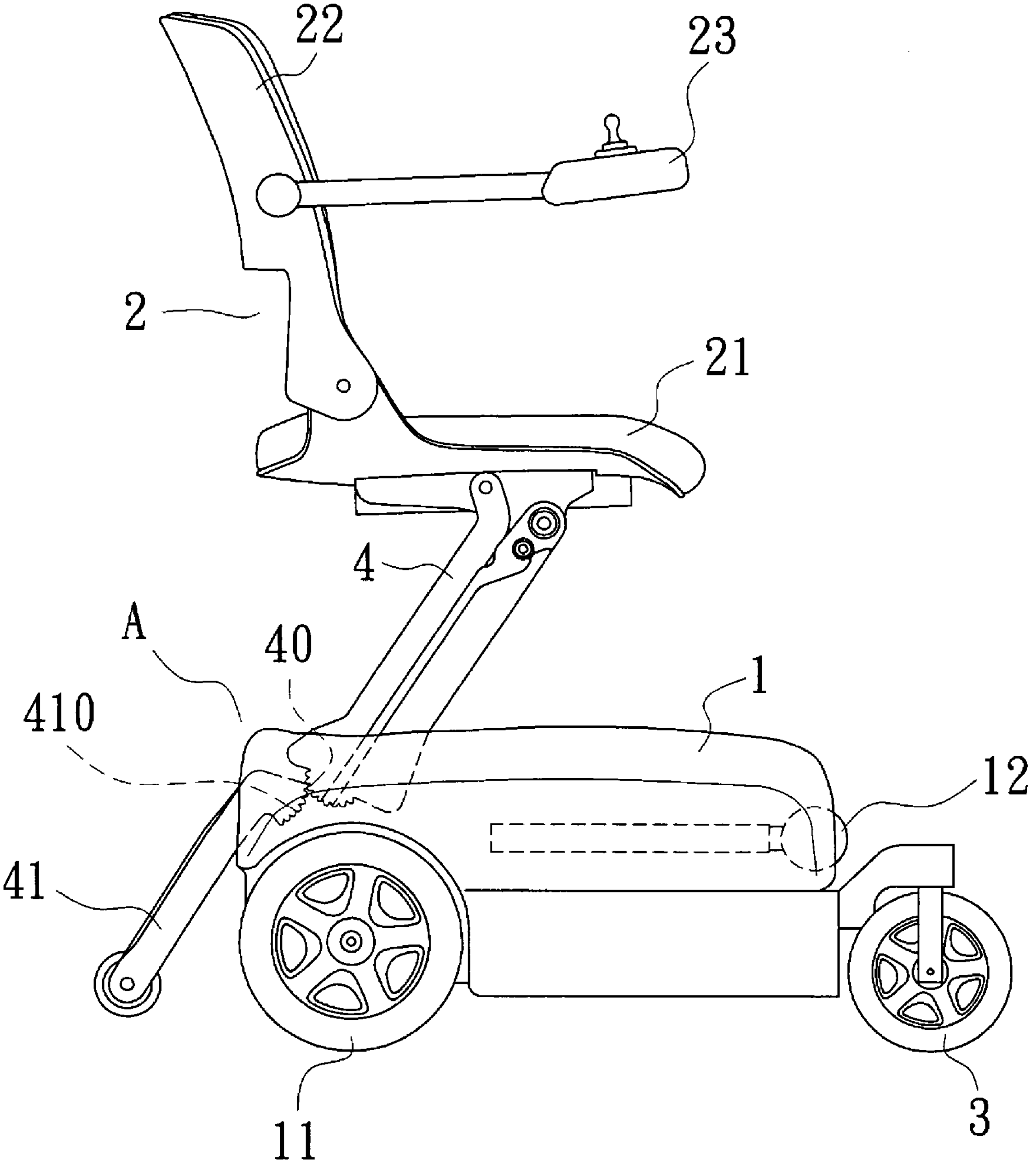
FIG. 3 is a schematic drawing showing an embodiment of the present invention being folded.
Figure 4:
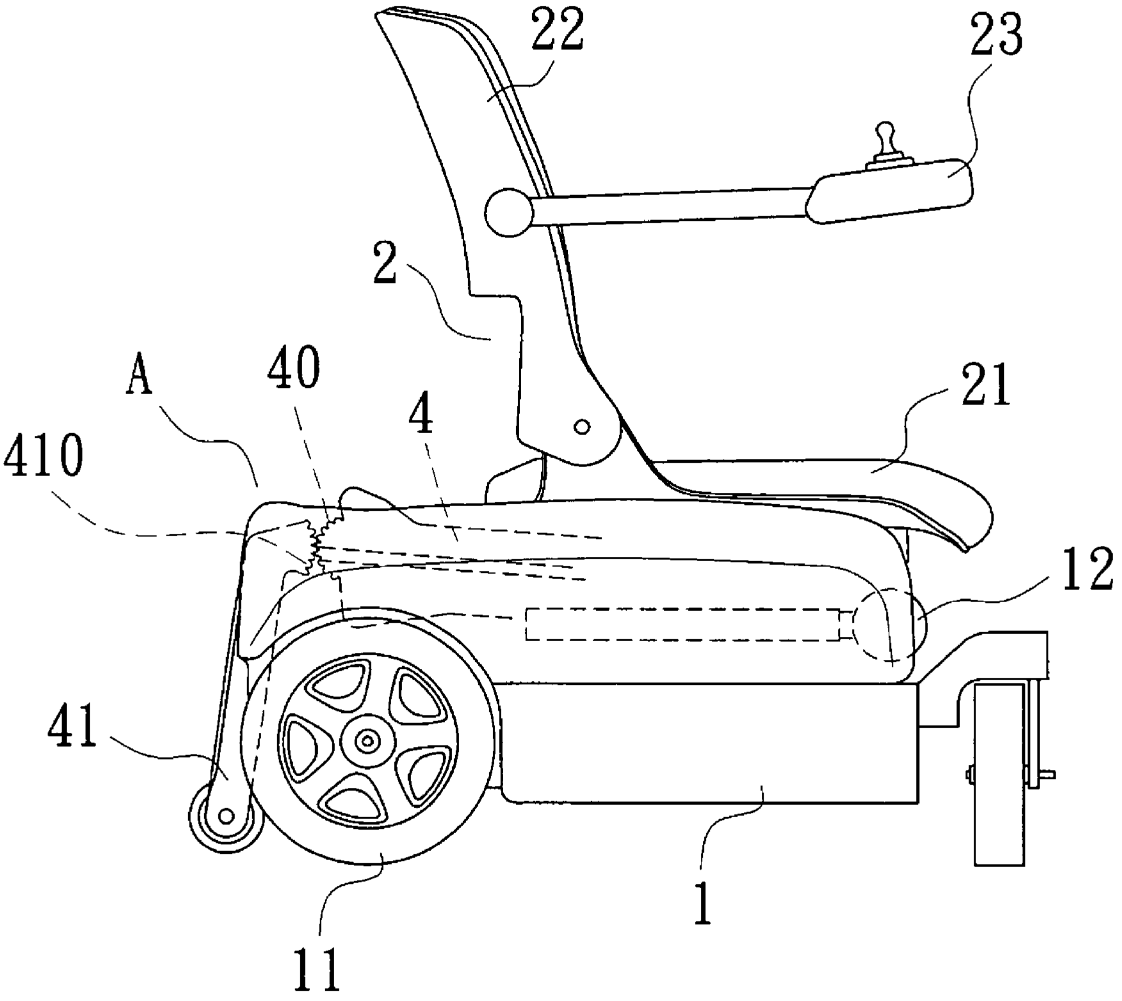
FIG. 4 is another schematic drawing showing an embodiment of the present invention being folded.
Figure 5:
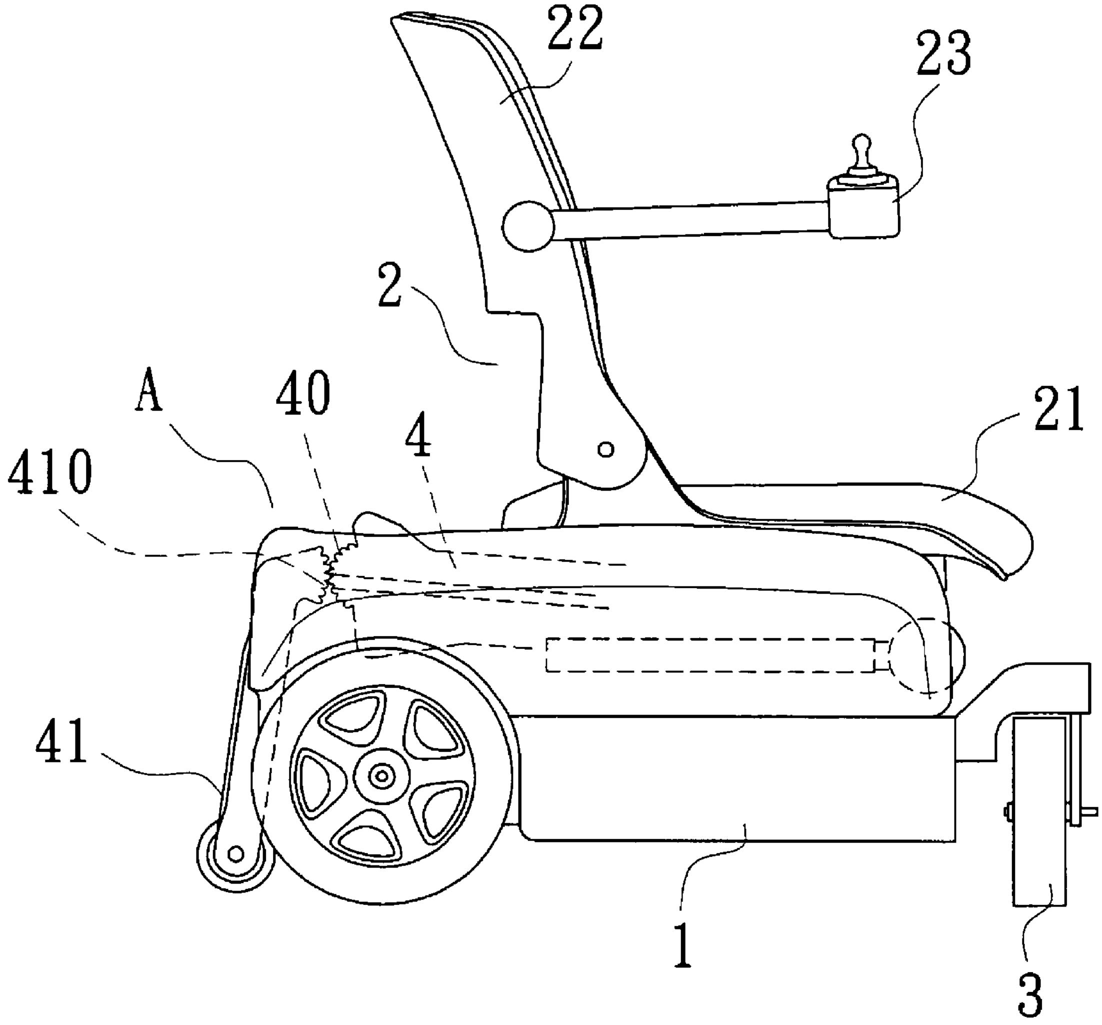
FIG. 5 is a further schematic drawing showing an embodiment of the present invention being folded.
Figure 6:
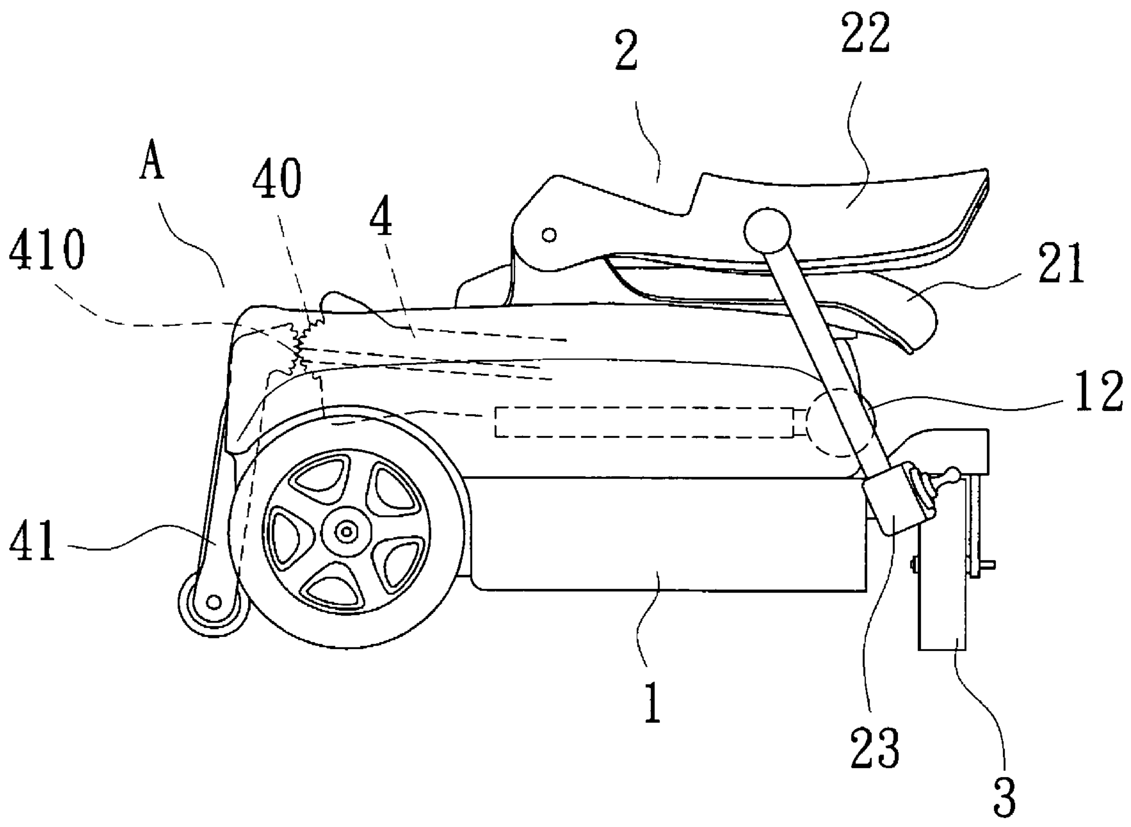
FIG. 6 is a further schematic drawing showing an embodiment of the present invention being folded.
Figure 7:
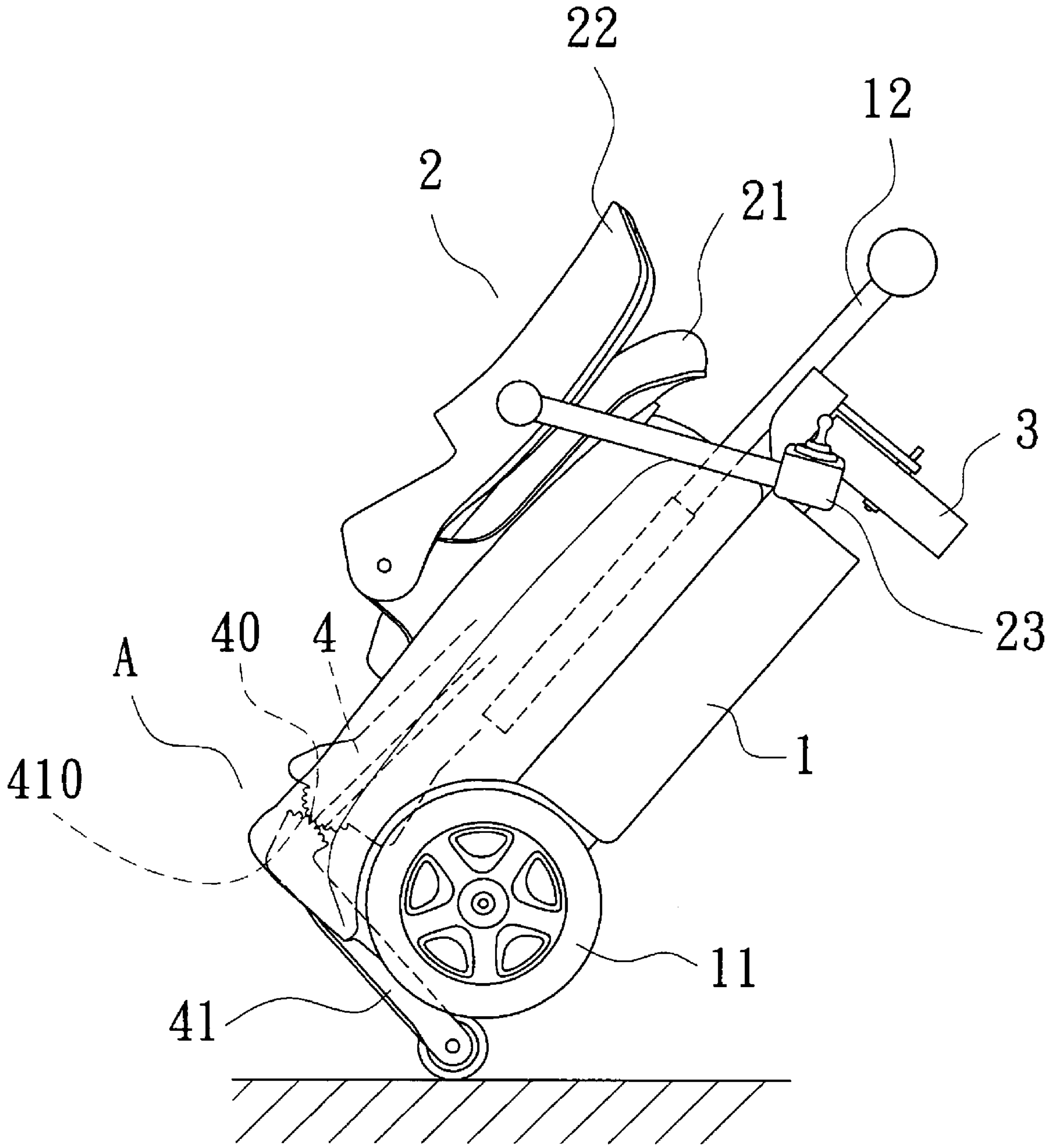
FIG. 7 is a schematic drawing showing an embodiment of the present invention being dragged and moved.

Refer from FIG. 1 to FIG. 2, an electric wheelchair of the present invention includes a main frame (1), main wheels (11) disposed on the main frame (1), a front wheel set (3) arranged on front of the main wheel (11) correspondingly on each of two sides thereof. A support (4) that enables a chair (2) to be folded forward is pivoted on the end of the main frame (1) with the main wheels (11). A locating member (6) with an extensible locating rod (61) is arranged between the support (4) and the main frame (1) so as to extend and fold the support (4). The use of the locating member (6) is only an embodiment of the extension and folding of the support (4), the details of the locating member (6) are not mentioned herein. Moreover, the support (4) drives an accessory tip wheel (41) by a connecting member (A). The connecting member (A) includes teeth (40) on the end of the support (4) and corresponding teeth (410) engaged with those teeth (40) on the support (4) arranged at the accessory tip wheel (41). Thus the connection is achieved. Furthermore, a footrest (5) is pulled out or stored between the two front wheel sets (3) of the main frame (1).

Back to FIG. 1, while in use, the main frame (1) is pivoted with the foldable support (4) which is disposed with the chair (2). A seat (21) and a back (22) of the chair (2) are unfolded, allowing people to sit on. At the same time, a controller (23) for control of the electric wheelchair on an armrest of the back (22) also extends out. The support (4) supporting the chair (2) also drives the teeth (410) of the accessory tip wheel (41) by the corresponding teeth (40) on the end of the support (4) of the connecting member (A) so as to make the accessory tip wheel (41) extends out from the main frame (1). Thereby, the accessory tip wheel (41) helps backward tilt of the users and ensures the safety of users when the users brake, drive the wheelchairs or lean backward. The users will not fall off due to movement of the center of gravity caused by the inertia. Moreover, the footrest (5) between the two front wheel sets (3) of the main frame (1) can be pulled out for user comfort.

Refer from FIG. 1 to FIG. 7, while not in use, firstly, the footrest (5) is received inside the main frame (1). Then the chair (2) is collapsed, close to the main frame (1) by the support (4) between the main frame (1) and the chair (2). Simultaneously, the accessory tip wheel (41) is folded into the main frame (1) by the teeth (40) on the end of the support (4) of the connecting member (A) engaged with and driving the teeth (410) of the accessory tip wheel (41). Moreover, the wheels of the front wheel sets (3) are turned to another direction so that the wheels will not slip or displace after the electric wheelchair being folded while the wheels and the chair (2) are in a balanced state. Next the controller (23) on the armrest of the back (22) is also bent inward and folded. The back (22) moves close to the seat (21). Then a grip (12) is pulled out of the main frame (1) so that the electric wheelchair is dragged and moved by the accessory tip wheel (41) folded close to the main frame (1).

In summary, compared with the device available now, the electric wheelchairs of the present invention have the following advantages:

1. By the support that connects the main frame with the chair, an accessory tip wheel is driven through action of the connecting member. Once users brake or lean backwards during movement of the electric wheelchair, they may fall back due to the inertia. The accessory tip wheel provides certain protection and the center of gravity of the wheelchair will not move. The safety of users is considered.
2. After the electric wheelchair being folded, it is dragged and moved easily by the design of the accessory tip wheel and the grip. The electric wheelchair is moved conveniently in storage or in transmission. Thus the electric wheelchair is with higher practical value.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An electric wheelchair comprising:

a main frame, main wheels disposed on the main frame, a front wheel set arranged in front of the main wheel correspondingly on each of two sides of the main frame, a support, enabling a chair to be folded forward, pivoted on an end of the main frame with the main wheels, an accessory tip wheel driven by the support through a connecting member while the connecting member having teeth on one end of the support and corresponding teeth engaged with those teeth on the support arranged at the accessory tip wheel, and a grip being pulled out of or received into the main frame.

2. The device as claimed in claim 1, wherein a controller for control of the electric wheelchair is arranged at the chair.

3. The device as claimed in claim 1, wherein a footrest being pulled out or stored in the main frame is disposed between the two front wheel sets.

4. The device as claimed in claim 1, wherein the support is extended and folded by a locating member.

* * * * *